C. E. TOMLINSON.
BEVERAGE DISPENSING MACHINE.
APPLICATION FILED MAR. 16, 1907.

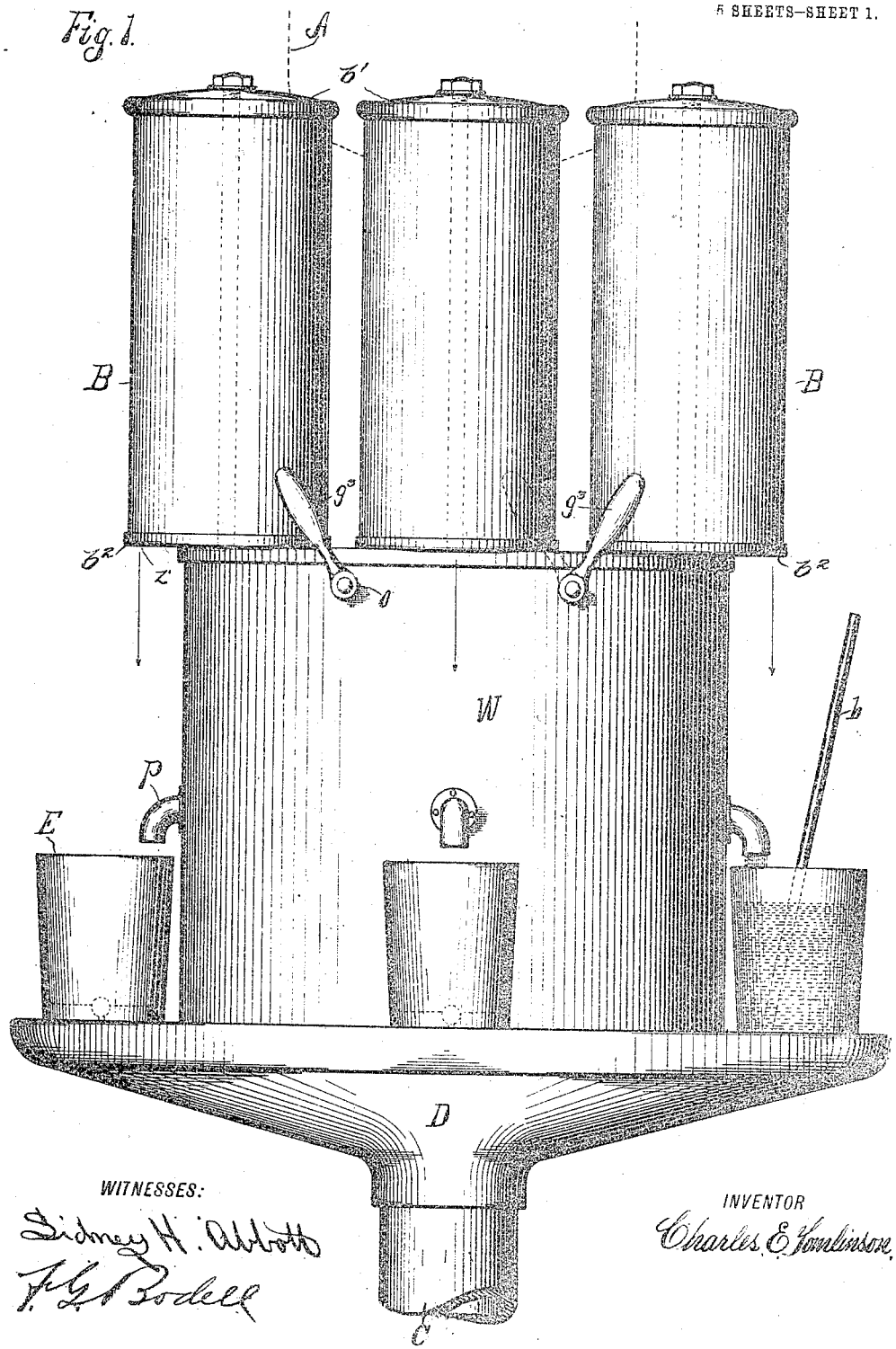

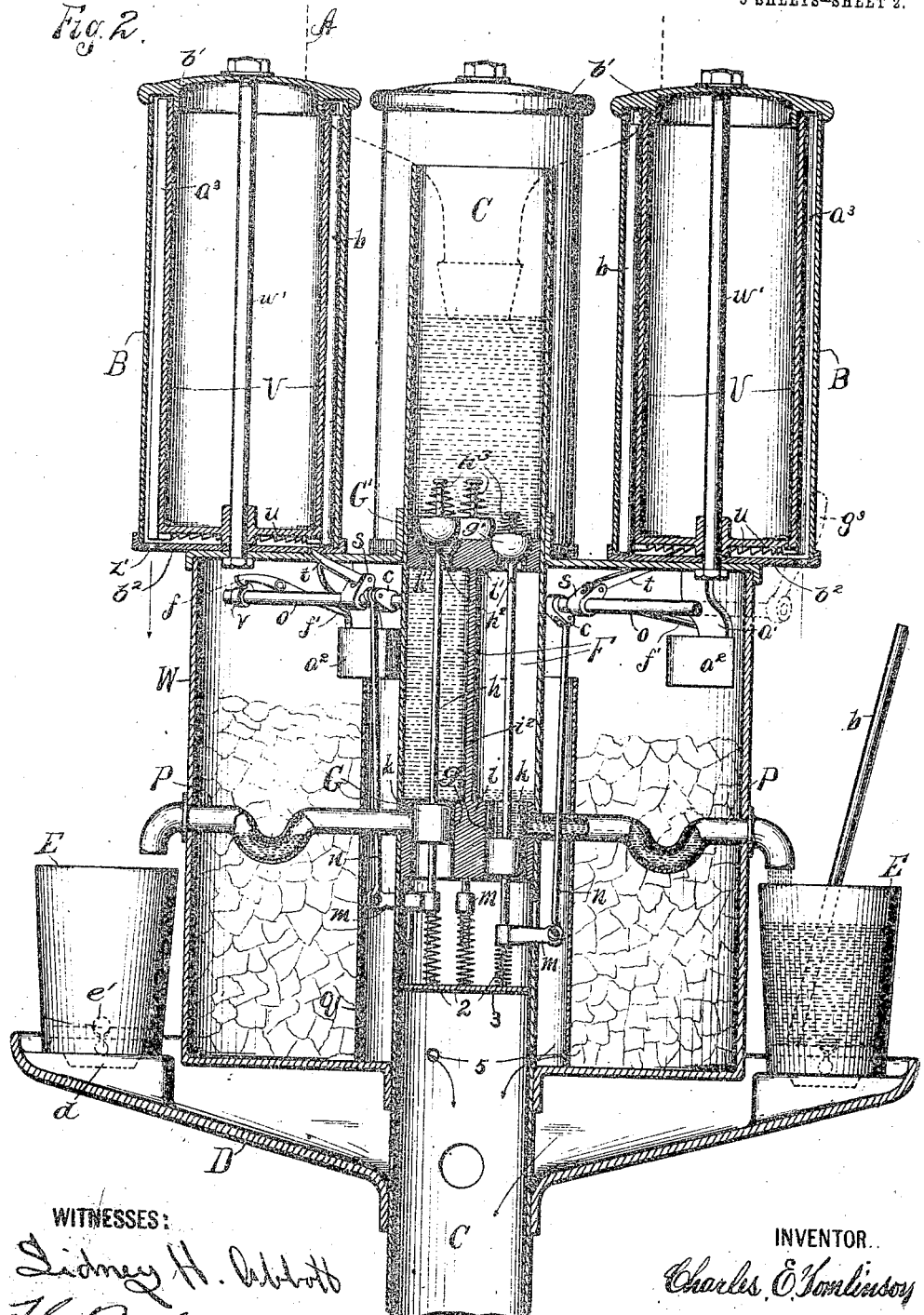

1,026,635.

Patented May 14, 1912.

5 SHEETS—SHEET 3.

WITNESSES:
Sidney H. Abbott
F. L. Bodell

INVENTOR
Charles E. Tomlinson

C. E. TOMLINSON.
BEVERAGE DISPENSING MACHINE.
APPLICATION FILED MAR. 16, 1907.

1,026,635.

Patented May 14, 1912.
5 SHEETS—SHEET 4.

WITNESSES:

INVENTOR
Charles E. Tomlinson

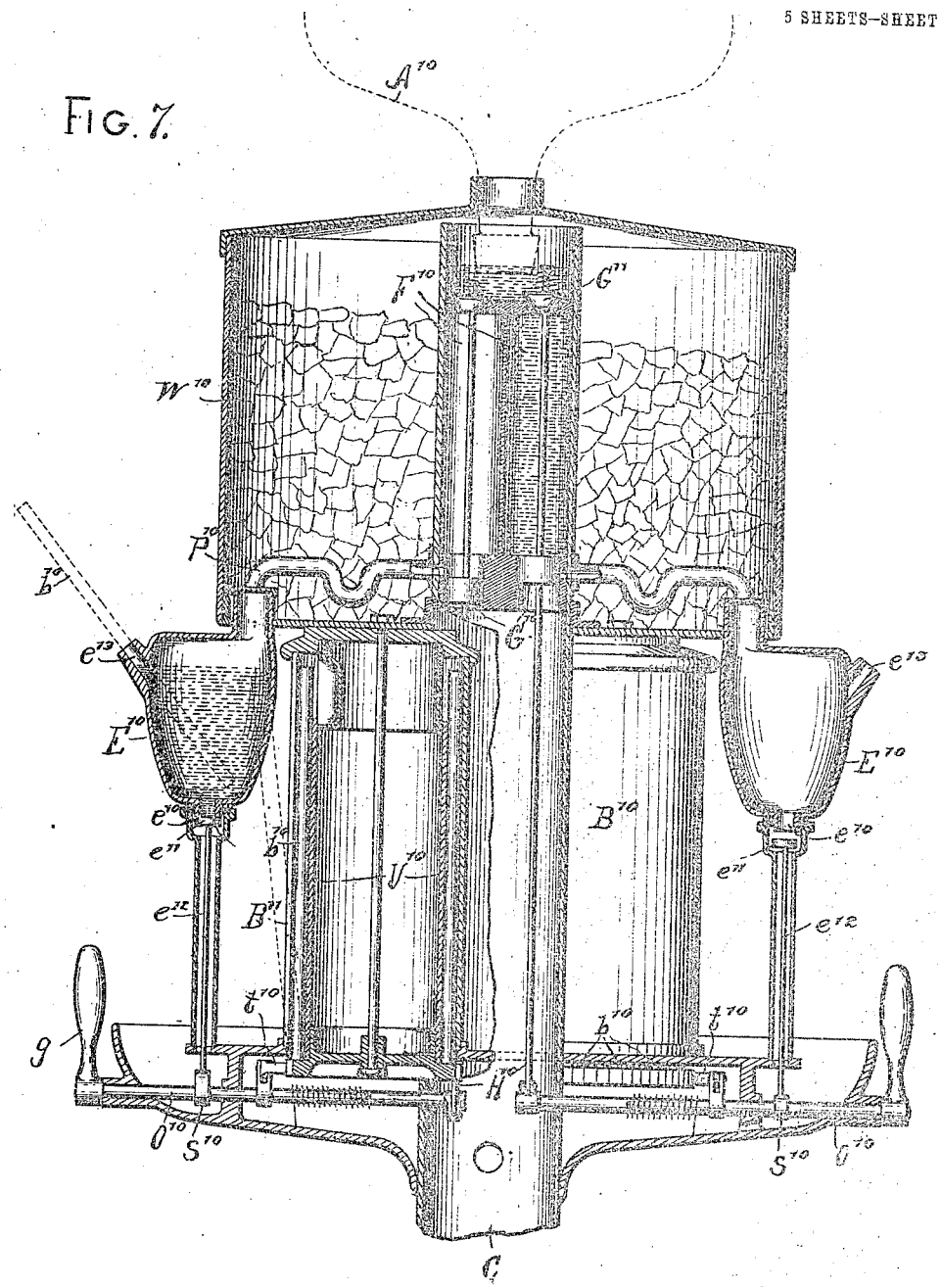

UNITED STATES PATENT OFFICE.

CHARLES E. TOMLINSON, OF SYRACUSE, NEW YORK.

BEVERAGE-DISPENSING MACHINE.

1,026,635.  Specification of Letters Patent.  Patented May 14, 1912.

Application filed March 16, 1907. Serial No. 362,773.

*To all whom it may concern:*

Be it known that I, CHARLES E. TOMLINSON, citizen of the United States, and resident of Syracuse, in the county of Onondaga and State of New York, have invented a certain new and useful Beverage-Dispensing Machine, of which the following is a specification.

My invention has for its object the production of a beverage dispensing machine, in which each user is provided with an individual mouthpiece, and it further has for its object a machine which is particularly simple in construction and hygienic in use; and unto these ends it consists of novel combinations, constructions and arrangements hereinafter set forth and claimed.

Figure 5:
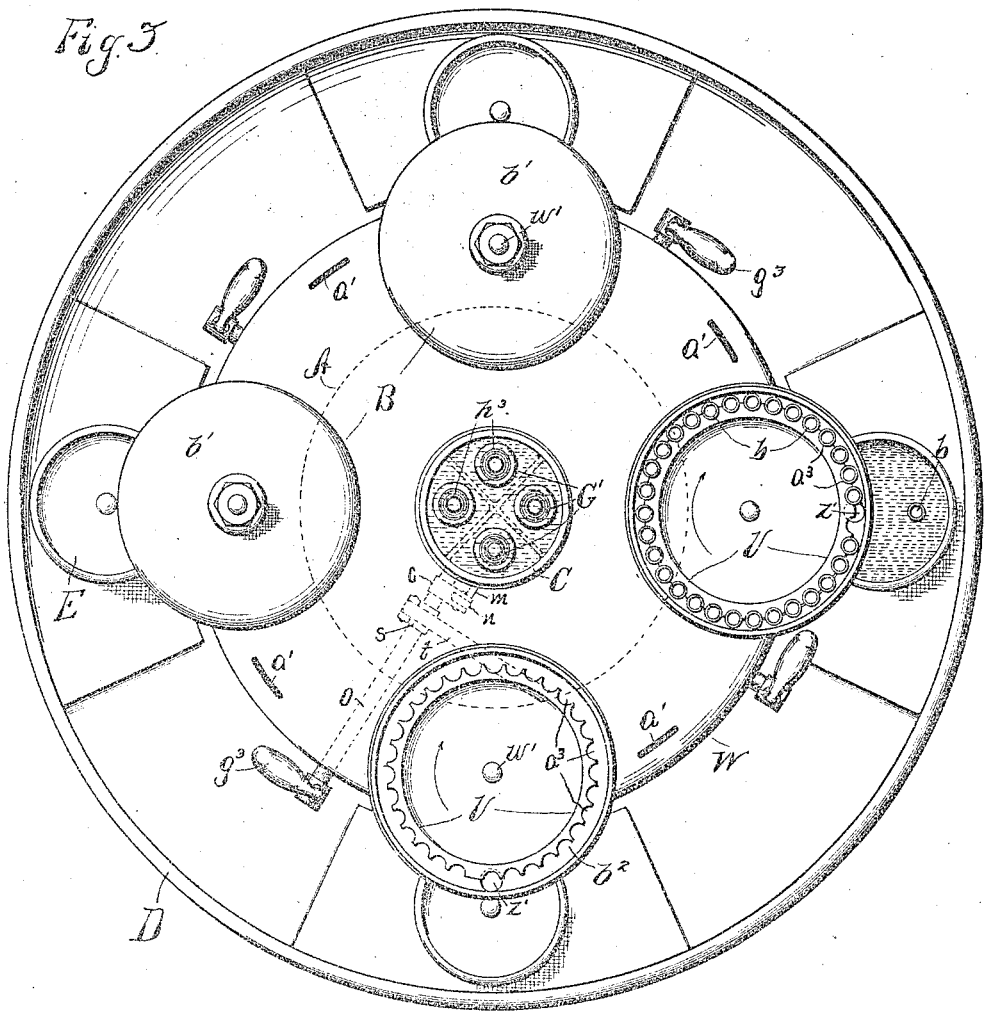
Figure 6:
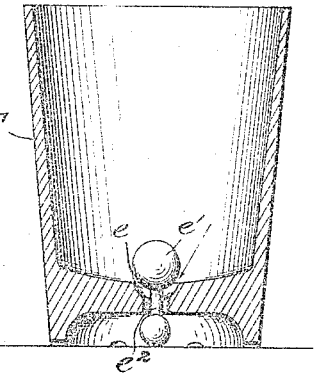
Figure 4:
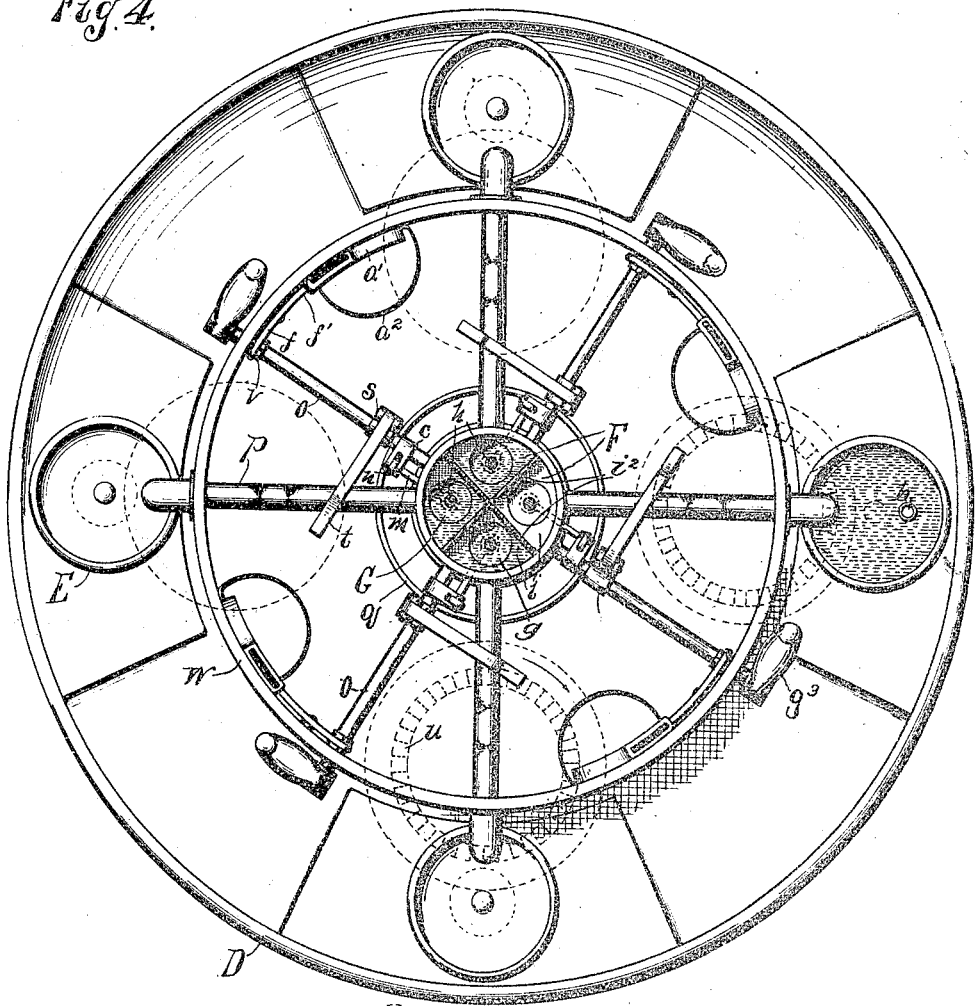
Figure 5:
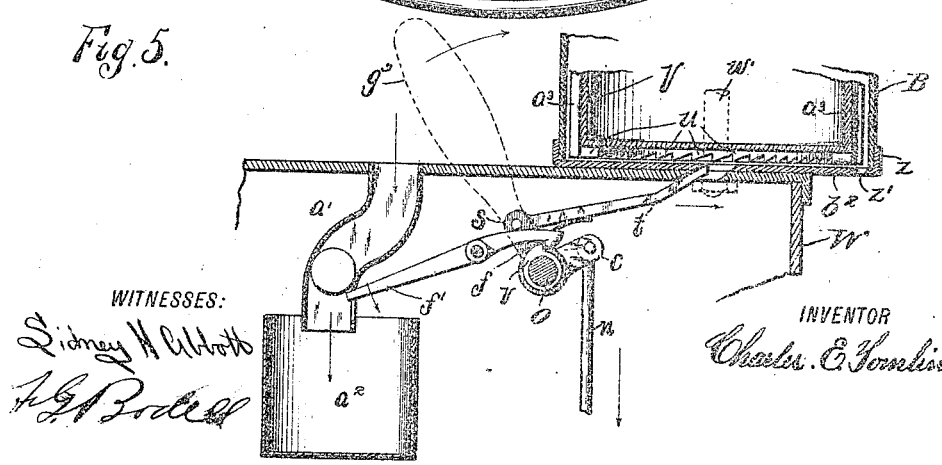

Figure 1 is an elevation showing the general arrangement of the exterior of one construction of my beverage dispensing machine. Fig. 2 is a vertical sectional view thereof. Fig. 3 is a plan with some parts removed. Fig. 4 is a plan of the lower portion of this machine. Fig. 5 is a detailed view, partly in section, of a coin-controlling mechanism and contiguous parts. Fig. 6 is a vertical section of a receptacle or drinking glass. Fig. 7 is a vertical section of a modified form.

In describing my invention, reference is had to the accompanying drawings, forming part of this specification, in which like characters designate corresponding parts in all the views.

This beverage dispensing machine comprises, primarily, a reservoir for the beverage, means for delivering the beverage and means for delivering an individual mouthpiece to each user.

The illustrated exemplification of my machine for dispensing beverage embodies, generally, a reservoir for the beverage, receptacles for receiving the beverage from the reservoir, means for holding individual mouthpieces or tubes, and means for controlling the delivery of the beverage to the receptacle and the mouthpiece from the holders into a position where they are accessible to the user.

A represents a liquid reservoir, here shown in dotted lines as an inverted bottle; and B a holder for mouthpieces, which mouthpieces are here shown as tubes $b$. The tube or mouthpiece holder is here shown as consisting of an incased rotatable drum V, having means for carrying on its peripheries a plurality of mouthpieces or tubes $b$. The drum is operated step by step upon each operation of the controlling means, hereinafter described, so that the mouthpieces or tubes, are alined one by one with an exit opening in the casing of the mouthpiece holder and drop down or out within reach of the user.

As here shown, C is a hollow column or standard by which the various parts are supported and into which the beverage or liquid from the reservoir flows. In this column or standard are placed for convenience liquid measuring chambers F, here shown as four in number, each having an inlet and outlet and provided with suitable valves G G'. These chambers are formed by placing upper and lower horizontal partitions $i$ and $i'$ in column C, said partitions connected together by vertical partitions $i^2$. The valves G G' are connected together by valve-rods $h$ which pass through the chambers F and are actuated by the operating mechanism, hereinafter described, of the machine.

The valve G' is arranged above the valve G and has a valve seat $g'$ formed in the opening or port $h'$ of the upper partition $i'$. Through this opening or port passes the valve-rod $h$ on which the valve G' is slidably secured and is held against the pin $h^2$ by a spring $h^3$, said spring being secured to the valve rod. At the opposite end of this valve-rod is fixed the valve G, having a valve seat $g$ formed in the lower partition $i$. As the valve rod $h$ is forced downward, it carries the valves G G', the valve G' is arranged so as to close before the valve G is opened and vice versa, by means of the spring $h^3$ which allows the valve rod $h$ to move farther downward after the valve G' has closed the port $h'$ in the partition $i'$ thus allowing the valve G to pass and open the port $h$ in the lower partition $i$. As this port is opened it allows the measured quantity of liquid in the chamber F to flow through a discharge pipe, or outlet P, which discharges into a drinking receptacle E, said drinking receptacle resting on a shelf or support, D secured to column C. As best shown in Fig. 6, this drinking receptacle E is preferably formed with a draining duct $e$ in its bottom which is open and closed by a valve $e'$ having a stem $e^2$ adapted to project below the lower edge of the bottom of the receptacle when the receptacle is held off of a plain surface and when the valve is in its closed position. The shelf D is provided with depressions $d$ here shown by dotted lines in Fig. 2 directly beneath the ends of pipes or outlets P so that the valve $e'$ of the drinking receptacle can assume its closed position when said receptacle is in said position for filling by the valve stem $e^2$ extending into said depression. However when the drinking receptacle is on the shelf but not in position to be filled the valve stem $e^2$ comes in contact with said shelf and opens the draining duct. Thus the shelf with its plain and depressed surfaces constitutes means for opening the valve of the receptacle when said receptacles are not in position to be filled, and for permitting the valve to close when the receptacle is in position to be filled.

Secured to the column or standard C, is an ice chamber W, and as here shown surrounds that part of the column in which the measuring chambers are placed, and as the pipe or outlet P, which conducts the liquid from the measuring chamber to the receptacle passes through said ice chamber it will keep said liquid cool, for convenience a part of the operating means is placed in the ice chamber and partition $q$ is placed around such parts that would be interfered with by the ice. Resting upon this ice chamber W and overhanging the same, is the mouthpiece or tube holder B consisting of an outer cylindrical casing or shell inclosing the rotary drum V, said casing or shell having a top and bottom $b^1$ $b^2$, said casing and top and bottom being held together and to the top of the ice chamber by the rod or bolt $w'$ as seen in Fig. 2. Inside of this casing or shell and around the rod $w'$ revolve the drum V, resting on the bottom $b^2$ of the tube holder B, said drum having grooves $a^3$ for carrying the tubes $b$ on its periphery. The tubes having been placed in these grooves are held from falling out by the outer casing or shell surrounding the same, as is best shown in Figs. 2 and 3. In the bottom $b^2$ of the holder B and inside its casing is an opening $z'$ which allows the tubes $b$ to be discharged as they are brought in alinement therewith by the revolving of the drum V. As here illustrated, the bottom of this revolving drum V is provided with ratchet teeth $u$ adapted to be engaged by a push pawl $t$ extending upward through the top of the ice chamber and the bottom $b^2$ of the tube holder B, said push pawl being pivoted to an arm $s$ projecting from and secured to a rock shaft O, said rock shaft having a bearing in the side of the ice chamber W and the column C. Also projecting from and secured to this rock shaft O is the arm $c$ to which one end of the rod $n$ is secured, the other end of rod $n$ being secured to the horizontal arm $m$ projecting through an opening in column C. Said arm $m$ connects to and controls the movements of the valve-rod $h$ as will be seen by the following:—To operate this machine, the handle $g^3$, which is secured to the rock shaft O, is moved sidewise, revolving the rock shaft O, which revolves the drum V by the push pawl $t$, engaging the ratchet teeth $u$, bringing the tube or straw in line with the opening $z'$ in the bottom $b^2$ of said tube holder B, thus allowing the tube to drop out, or into a receptacle E resting on shelf D, and by the same operation the arm $c$ through the rod $n$ causes the valve G' to close the port $k'$ and valve G to open the port $k$, thus allowing the liquid from the measuring chamber to flow through the outlet P into the receptacle. When the operator releases the handle $g^3$, the parts are carried back to their normal position by means of a spring 2 which rests upon a plate 3 and presses against the valve rod $h$, thus allowing the refilling of the measuring chamber. The drip from the receptacles or ice reservoir passes through an opening 5 into the base below.

My machine may be used as a vending machine, and the operation of its controlling means controlled in any suitable manner by coin controlling mechanism. As here shown, I have provided a notched collar $v$ secured to the rock shaft O, and a hook lever $f$ secured to the side of the ice chamber, the hook end of said lever engaging the notch of the notched collar thus preventing the revolving of the rock shaft O, but by placing a proper coin in a coin chute $a'$ the coin would weigh down the end $f'$ of this lever $f$, thus causing its opposite end to release said rock shaft O, the coin dropping into the receptacle $a^2$. When used simply as a drinking fountain, no coin controlling mechanism is necessary, and in some cases the measuring device may also be dispensed with.

In Fig. 7 is illustrated another form of the beverage dispensing machine in which the drinking receptacles $E^{10}$ are permanently fixed and are entirely closed except at an opening $c^{13}$ for the inserting of the mouth-pieces $b^{10}$. In this construction the component parts of the machine are arranged in different order from the parts of the machine shown in Figs. 1 to 6. The ice chamber $W^{10}$ with measuring chambers $F^{10}$ therein being located above the mouth-piece holders $B^{10}$ the mouth-pieces $b^{10}$ instead of being dropped down or into the drinking receptacle $E^{10}$ as in the construction heretofore described, are fed to a position where they may be reached by the user. To obtain this the casing or shell in which the drum $V^{10}$ revolves has an opening $B^{11}$ lengthwise, so, as the tubes are fed one by one to this opening by the operating means they may be picked out by the user. The valves $G^{10}$ $G^{11}$ of the measuring chamber $F^{10}$ and the drums $V^{10}$ of the mouth-piece holder $B^{10}$ are operated in substantially the same manner as in the preferred construction, by a rock-shaft $O^{10}$ having connected thereto the push pawl $t^{10}$ and valve rod $H^{10}$, but in addition to operating the measuring chambers and the drum of the mouthpiece holder, the rock-shaft also operates a drainage valve $e^{11}$ located in the bottom of each drinking receptacle $E^{10}$. These valves $e^{11}$ are normally in a position to permit the liquid to drain from said drinking receptacles through the duct $e^{10}$, and are moved into its closed position when the rock-shaft is operated by means of a lifting cam $S^{10}$ secured to said rock shaft which lifts the valve rod $e^{12}$. The said valve will remain in its closed position so long as the rock-shaft is held from returning to its starting position. No coin controlling mechanism is shown in this construction as any suitable controlling mechanism may be employed.

An essential feature of my invention is the delivery of a mouthpiece, as a tube or straw, to each user, to withdraw the liquid from the receptacle or glass thus rendering the machine absolutely sanitary and eliminating all possibility of spreading disease, and allowing its use in hospitals, hotels and public places. It will be understood, however, that it is not necessary to deliver the tube and liquid simultaneously, or by the same mechanism to meet the spirit of my invention.

What I claim is:—

1. In a liquid dispensing machine, a liquid container, a passage leading therefrom, a valve controlling said passage, operating means for the valve, mouthpiece holding and feeding means, operating means for controlling the feeding of the mouthpieces, and a single part for actuating both of said operating means, substantially as and for the purpose described.

2. In a liquid dispensing machine, a liquid container, a support for a receptacle, a passage leading from the container and having a nozzle overhanging the support, mouthpiece holding and feeding means arranged to deliver a mouthpiece into the receptacle on the support beneath the nozzle, substantially as and for the purpose specified.

3. In a liquid-dispensing apparatus, a liquid container, a valve-controlled passageway leading therefrom, a mouth-piece holder having a rotary part adapted to carry a plurality of mouth pieces, said mouth-piece holder having a single discharge outlet, and means for operating the valve in the passageway leading from the liquid container and for bringing a single mouth-piece into registration with said outlet in the mouth-piece receptacle, and a single movable element for operating said means, substantially as and for the purpose set forth.

4. In a liquid dispensing machine, a liquid container, a support for a receptacle, a passage leading from the container and having a nozzle overhanging the support, a valve controlling said passage, operating means for the valve, mouthpiece holding and feeding means including a part having an exit for the mouthpieces located above and slightly out of vertical alinement with said nozzle in order that a mouthpiece released from the holding and feeding means will drop into the receptacle under the nozzle, operating means for controlling the feeding of the mouthpieces through said exit, and a single part for actuating both of said operating means, substantially as and for the purpose set forth.

5. In a liquid-dispensing apparatus, a liquid container disposed centrally of the apparatus, discharge passages leading laterally from said container and valve controlled, a plurality of receptacles adapted to each inclose a plurality of mouth-pieces and each provided with a single discharge outlet, one of said receptacles being associated with each discharge passage, and means common to each passage and its associated receptacle for opening the valve controlling said passage and for bringing one of the mouth-pieces in such receptacle into registration with the discharge outlet thereof, substantially as and for the purpose specified.

6. In a liquid-dispensing apparatus, a liquid container disposed substantially centrally of the apparatus, a plurality of discharge passageways radiating from said container and each provided with a controlling valve, a series of receptacles for holding elongated mouth-pieces, each receptacle having an inclosing wall and having a single discharge outlet and said receptacles having their longer axes arranged parallel to the axis of the liquid container, and means for simultaneously opening the valve of one of said passages and for presenting one of the mouth-pieces in one of the receptacles in registration with the discharge outlet thereof, substantially as and for the purpose described.

7. In a liquid-dispensing apparatus, a liquid container having a valve-controlled outlet, means for supporting a receptacle for receiving the discharge from said outlet, a drain passage in said receptacle, and means for closing said passage when the receptacle is unsupported by said supporting means and for opening communication between the receptacle and the drain passage when the receptacle is supported upon said supporting means, substantially as and for the purpose specified.

Signed at Syracuse in the county of Onondaga and State of New York this 13th day of March, A. D. 1907.

CHARLES E. TOMLINSON.

Witnesses:
S. DAVIS,
E. K. SEEMILLER.